May 20, 1924.
A. H. NELLER
MUD LUG FOR AUTOMOBILES
Filed Oct. 24, 1923
1,494,862
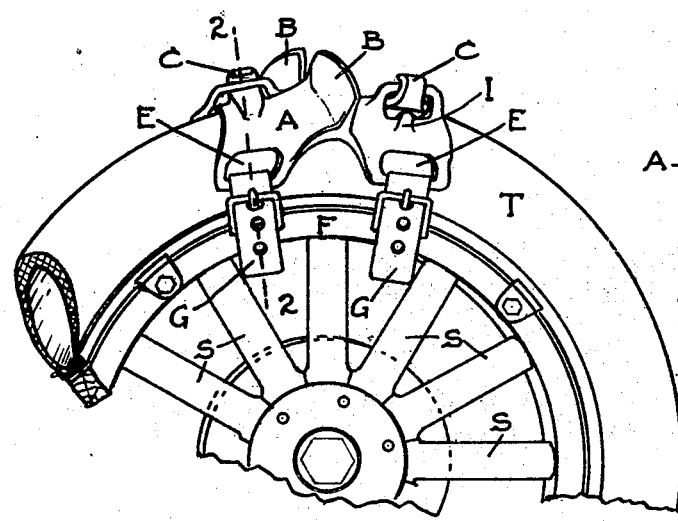
FIG. 1
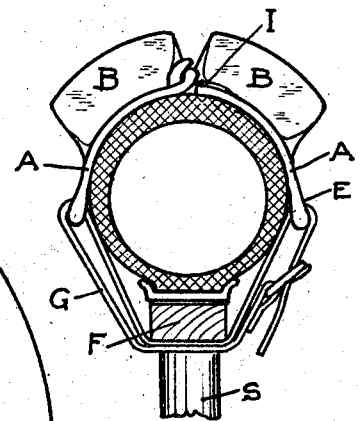
FIG. 2
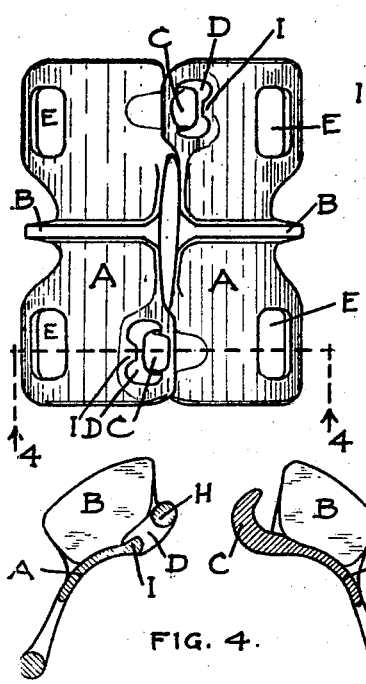
FIG. 3
FIG. 4
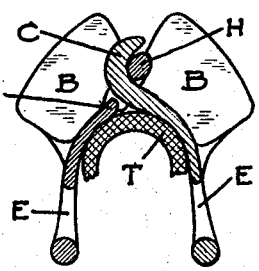
FIG. 5
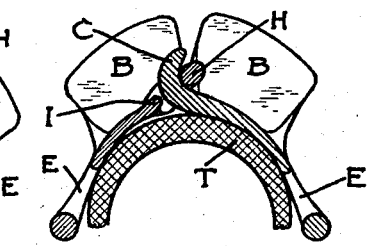
FIG. 6
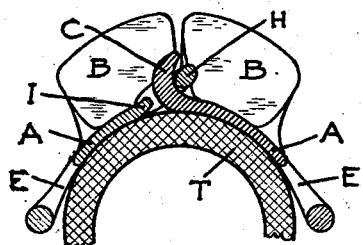
FIG. 7
INVENTOR
Albert H. Neller,
BY William Londes
ATTORNEY Patented May 20, 1924.

1,494,862

UNITED STATES PATENT OFFICE.

ALBERT H. NELLER, OF FAIRFIELD, IOWA.

MUD LUG FOR AUTOMOBILES.

Application filed October 24, 1923. Serial No. 670,476.

*To all whom it may concern:*

Be it known that I, ALBERT H. NELLER, a citizen of the United States, residing at Fairfield, in the county of Jefferson and State of Iowa, have invented a new and useful Improvement in Mud Lugs for Automobiles, of which the following is a specification.

My invention relates to that class of devices adapted to be readily attached to the tires of automobile wheels for ready use to augment the traction of the driving wheels of the automobile, when stalled in a mud hole, and to thereby assist in getting the auto out of the hole, and then to be readily detached from the wheel and to be stored in a tool box or some other small place when not in use; and it consists of an improvement in the construction of the device whereby it is better adapted to fit different sizes of tires, can be more securely attached to the tire, with less injury thereto and will also be more effective in operation, as will be hereinafter set forth.

Referring to the accompanying drawings which form a part of this specification, Fig. 1 is a side view, partially in perspective, of a portion of an automobile wheel having a mud lug consisting of two mating members attached to the wheel and embodying my invention. Fig. 2 is an enlarged transverse section on line 2—2 of Fig. 1. Fig. 3 is an enlarged top or plan view of the mud lugs connected together but detached from the wheel. Fig 4 is a transverse section on line 4—4 of Fig. 3 looking in the direction of the arrow, and showing the members separated from each other. Figs. 5, 6 and 7 are similar sectional views showing the members connected together and fitted to portions of tires of different dimensions.

Referring to the drawings, S represents the spokes of the wheel, F the felly or felloe and T the tire of the portion of the automobile wheel shown, and on which the members A are mounted. These members are curved in cross section to fit the average convex surface of the tires on which they are mounted, and are provided with outstanding flanges B which constitute the lugs to catch in the body of the roadway and to thereby increase the traction of the wheels to which the device is attached.

The members A are provided with connecting hooks C and also with co-acting eyes D, by means of which they are connected together. The members A are preferably elongates, or in other words, their longitudinal dimensions are greater than their cross section dimensions, and it is also preferable that a hook C be placed on the edge of each member near one end, and that a co-acting eye D be placed on the same edge of each member near the other end. In this way only one pattern will be required for the members, and when their edges are placed together the hook near one end of one of the members will catch in the eye near the adjacent end of the other member, which is accomplished at both ends, as shown by Fig. 4.

To secure the members to the wheel eyes E are formed in their opposite edges near the ends thereof, and adjustable fastening means are passed through said eyes so as to have a bearing on different parts of the felly of the wheels, preferably on opposite sides of a spoke as shown in Fig. 1. Straps G each having a buckle on one end and a number of perforations in the other end for the tongues of the buckle to engage may be used by means of which the device may be readily attached to tires of different sizes and be as readily removed therefrom. Or if preferred, strong cords or small ropes may be passed through the eyes E and their ends be tightly tied together to hold the device on the wheel; and in detaching it the cords or ropes may be cut apart and thrown away. Other kinds of fastenings may also be used without departing from the spirit of my invention.

The advantages secured by making the members A elongated are important. It furnishes a longer bearing on the tire which is desirable because the strain of the traction is lengthwise of the surface of the tire and a short bearing on it is liable to kink and injure it. The longer bearing of the members A also makes them less liable to slip on the tire and the fastenings being near each end of the elongated members, enables them to come in contact with at least two spokes of the wheel as shown in Fig. 1, which construction braces the members in either direction as the auto may be driven forward or backward.

The method of connecting the members A together is also advantageous. It will be seen that the inner faces of the hooks are formed on a larger circle than the contacting portions H of the eyes D. Consequently the hooks are adapted to slide on the portions H as the free sides of the members are spread apart or drawn together and will more perfectly fit different sizes of tires, as shown in Figs. 5, 6 and 7. As a result of this sliding action, the curved inner portions of the members A will more nearly conform to the circumference of the different sizes of tires to which they may be applied, than if the joints were closely fitting.

It it also advisable to guard against an excess of play or looseness in the joints of the members A, and to do this I have formed inwardly pointing projections I on the inner sides of the eyes, as most plainly shown in Figs. 4, 6 and 7. These projections will come in rather close contact with the central portions of the outer sides of the hooks C, and if they should happen to fit a little too closely it will be an easy matter to dress off the points of the projections a little to secure proper adjustment.

The device is exceedingly simple, effective in operation, easy on the tires and is readily adjusted to fit different sizes of tires. It will also be useful in driving automobiles through deep loose sand or snow, as well as through mud holes.

What I claim is:—

1. In mud lugs for automobiles, a pair of horizontally elongated members curved in cross-section to fit the convex surface of the tires of the wheels thereof, means on the meeting edges of the members near their ends to jointedly and detachably connect them together, eyes in the opposite edges of the members, also near their ends, for attaching connecting means thereto, a single outstanding laterally disposed centrally located lug on each of the members, and adjustable fastening means passed through the last mentioned eyes in the members and by the felly of the wheel, whereby the members will be adjustably and detachably secured to the wheel.

2. In mud lugs for automobiles, a pair of horizontally elongated members curved in cross-section to fit the convex surface of the tires of the wheels thereof, co-acting hooks and eyes on the meeting edges of the members near their ends to jointedly and detachably connect them together, eyes in the opposite edges of the members also near their ends, for attaching connecting means thereto, a single outstanding laterally disposed centrally located lug on each of the members, and adjustable fastening means passed through the last mentioned eyes in the members and by the felly of the wheel, whereby the members will be adjustably and detachably secured to the wheel.

3. In mud lugs for automobiles, a pair of horizontally elongated members curved in cross-section to fit the convex surface of the tires of the wheels thereof, co-acting hooks and eyes on the meeting edges of the members near their ends to jointedly and detachably connect them together, eyes in the opposite edges of the members, also near their ends for attaching connecting means thereto, a single outstanding laterally disposed centrally located lug on each of the members and adjustable fastening means passed through the last mentioned eyes in the members and by the felly of the wheel, whereby the members will be adjustably and detachably secured to the wheel, the inside curves of the co-acting hooks having a larger radius than the contacting portions of the eyes.

4. In mud lugs for automobiles, a pair of horizontally elongated members curved in cross-section to fit the convex surface of the tires of the wheels thereof, co-acting hooks and eyes on the meeting edges of the members near their ends to jointedly and detachably connect them together, eyes in the opposite edges of the members also near their ends, for attaching connecting means thereto, a single outstanding laterally disposed centrally located lug on each of the members, and adjustable fastening means passed through the last mentioned eyes in the members and by the felly of the wheel, whereby the members will be adjustably and detachably secured to the wheel, said first mentioned eyes having inwardly disposed projections in close proximity to the outer surfaces of the co-acting hooks.

Fairfield, Iowa, October 22, 1923.

ALBERT H. NELLER.